March 8, 1960
H. H. WERMINE
2,927,952
AIR INSULATED ELECTRICAL CABLE
Filed April 8, 1953
3 Sheets-Sheet 1
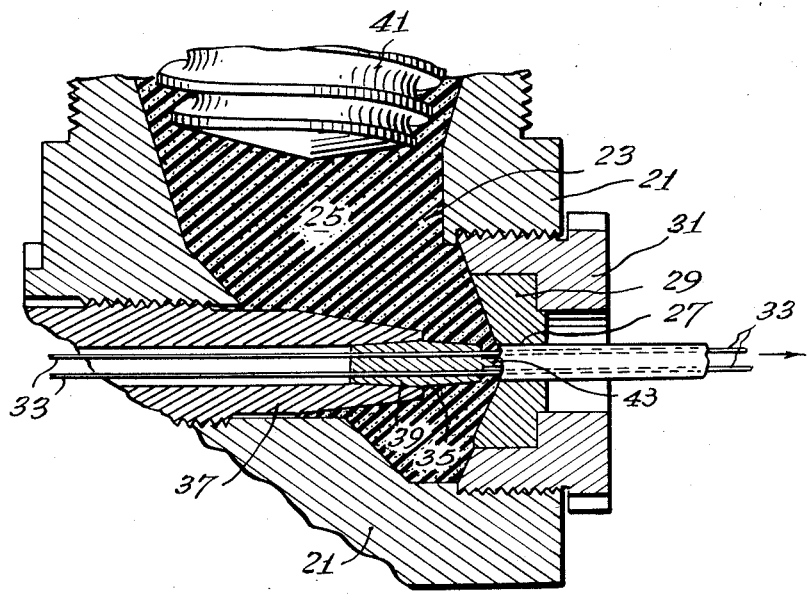
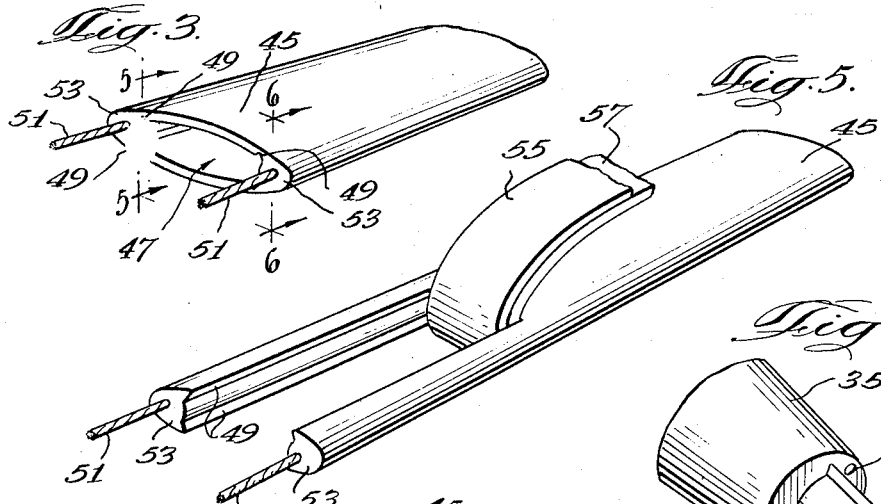
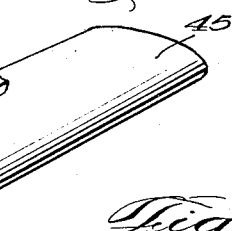
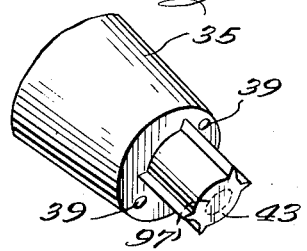
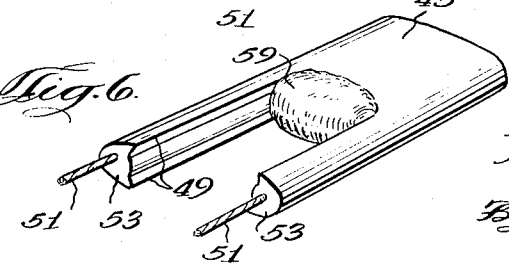
Inventor
Hugo H. Wermine
By Soans, Glaister & Anderson
Attorneys

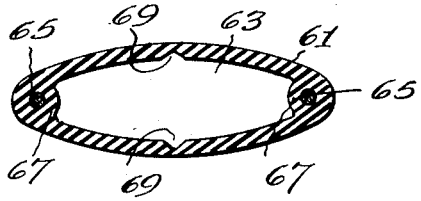
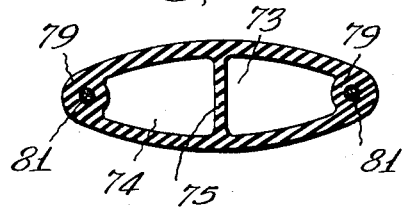
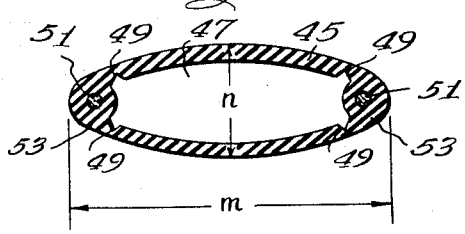
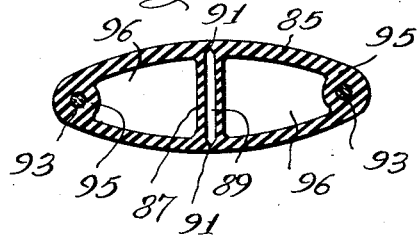
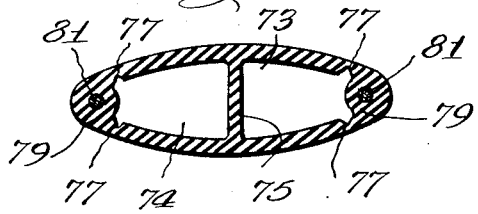

March 8, 1960  H. H. WERMINE  2,927,952
AIR INSULATED ELECTRICAL CABLE
Filed April 8, 1953  3 Sheets-Sheet 3
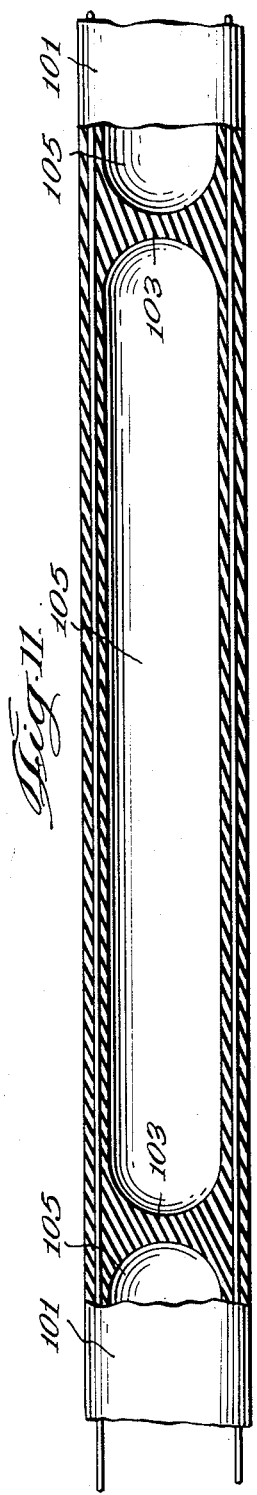
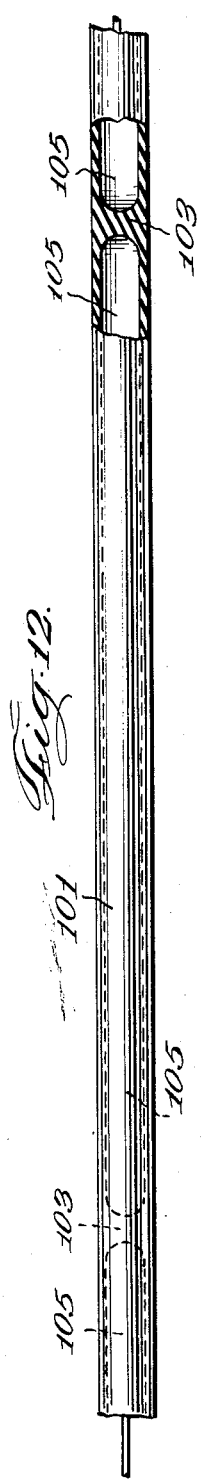
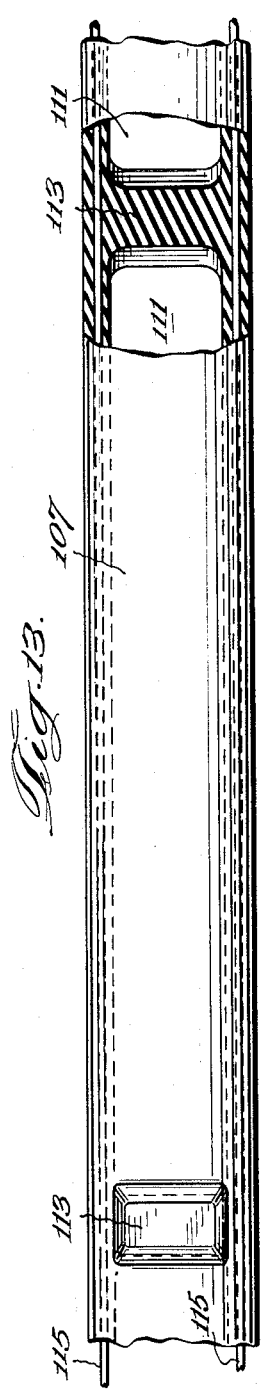
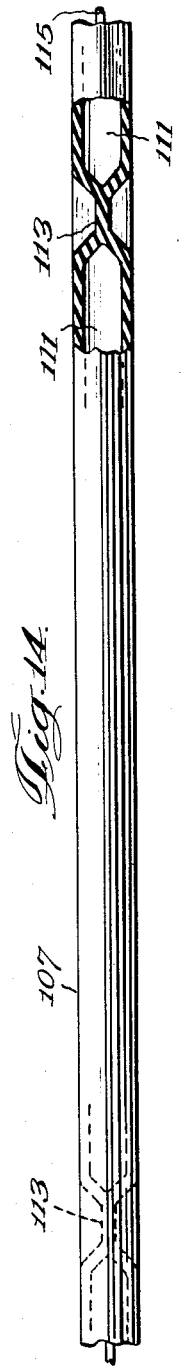
Inventor
Hugo H. Wermine
By Soans, Glaister & Anderson
Attorneys

United States Patent Office 2,927,952
Patented Mar. 8, 1960

2,927,952

AIR INSULATED ELECTRICAL CABLE

Hugo H. Wermine, Wheaton, Ill., assignor to Belden Manufacturing Company, Chicago, Ill., a corporation of Illinois Application April 8, 1953, Serial No. 347,516

3 Claims. (Cl. 174—27)

The present invention relates to high frequency electrical transmission lines, and has particular relation to duplex and other multiple conductor cables suitable for high frequency energy transmission, and especially for television lead-in service.

Multiple conductor cables for television lead-in and similar high frequency use must satisfy a number of quite exacting, electrical, mechanical and economic requirements, some of which are conflicting in nature. To conform to the accepted practices of the industry, it is important that such cables shall present a predetermined impedance to the load, which impedance is in accordance with the design standards of the equipment with which the cable is to be used. In addition, to maintain good electrical efficiency in the associated apparatus, the design impedance of the cable should remain substantially constant throughout the useful life of the cable, independently of the surrounding conditions. The attaining and the maintaining of this impedance value usually requires that the internal capacitance of the line shall be as low as possible, and that this capacitance shall change as little as possible during use of the cable.

It is also necessary that satisfactory cables for television and similar high frequency use shall be capable of being installed without unreasonable difficulty. Moreover, since such cables are frequently installed on the outside of buildings and on other outdoor structures, it is important that the cable shall be capable of being installed without unreasonable disfigurement of the building, and in instances where the cable passes alongside of metal objects, such as flashing or guttering, it is usually considered advisable to transpose the conductors by twisting the cable in order to maintain uniform electrical characteristics.

During installation, it is almost always necessary to separate the individual cable conductors at either or both ends of the cable in order to complete the electrical connections. Thus, it is very desirable that the cable structure shall be of the divisible type to permit this separation to be accomplished with a minimum expenditure of installation time and effort.

In addition to the electrical and mechanical requirements of the cable set forth above, it is of very great importance that the cost of the cable shall be within reasonable limits. It is often necessary to use rather long lengths of transmission cable, and unless the cost of the cable is within reason, it cannot be sold, regardless of how well it meets the other requirements.

Various cable arrangements have been suggested in the past for television lead-in and similar high frequency transmission purposes, but none has proven completely satisfactory. For example, one type which is in quite widespread use has a cross-sectional outline which is somewhat similar to the cross-sectional outline of a dumbbell, and while this cable, when new, gives quite satisfactory results, its electrical characteristics deteriorate rapidly when the cable becomes wet or when its surface becomes dirty.

In another type, the conductors are spaced on opposite diameters of a hollow, generally tubularly-shaped insulating body. This unit has good electrical characteristics when new, but unless it is sealed at both ends—a time consuming and somewhat troublesome operation—condensation and dirt collect within the line, and its electrical characteristics are markedly impaired over the passage of time. Further, this tubular cable is very difficult to install due to its inherent stiffness, this being especially aggravated in cold weather conditions, as are frequently encountered in the installation of television lead-ins out of doors, and it is almost impossible to effect transposition of the cable by twisting when the cable is positioned adjacent conducting surfaces. This duplex, tubular cable, as produced commercially, is of the divisible type, although the separation of the individual conductors requires some care and experience.

The principal object of the present invention is to provide a high frequency cable, and especially a divisible, duplex conductor, high frequency cable, suitable for use as a television lead-in cable or the like.

As will hereinafter appear, this object of the invention is accomplished by the provision of a cable which includes a hollow, outer sheath having a cross-sectional outline which is approximately described as an elongated, flattened oval, or ellipse. The outer wall surface of the sheath is smooth and the inner wall surfaces are of special contour and function. The conductors are disposed at opposite sides of the flattened sheath, and in one embodiment, the insulation is sealed at periodic intervals along the length of the cable.

In the drawings, Figure 1 is a fragmentary, sectional view of an extrusion apparatus of the general type used in the manufacture of cable embodying the features of the present invention;

Figure 2 is an enlarged, perspective view of a portion of the apparatus illustrated in Figure 1;

Figure 3 is a perspective view of one embodiment of the invention;

Figure 4 is a sectional view of the cable structure illustrated in Figure 3;

Figures 5 and 6 are perspective views illustrating one way in which the two individual leads and the insulation surrounding those leads can be separated from the remaining portions of a cable of the general type illustrated in Figures 3 and 4, and one procedure for sealing the adjacent end of the cable;

Figures 7, 8, 9 and 10 are sectional views, similar to Figure 4, illustrating other embodiments of the invention;

Figures 11 and 12 are, respectively, plan and side elevational views, partially in section, of an embodiment of the invention wherein the cable insulation is sealed at periodic intervals along a length of the cable; and Figures 13 and 14 are views, similar to Figures 10 and 11, of a second type of periodically sealed cable.

As previously stated, the improved, high frequency cable of the present invention is particularly adapted for use as a television lead-in, and the embodiments of the invention illustrated in the drawings are duplex cables especially designed for this service. The cables can, however, be used for other purposes. Generally, each of the illustrated embodiments comprises a hollow, relatively thin-walled, self-supporting sheath or body of suitable insulating material which in cross section has the shape of a flattened oval or ellipse. The two conductors are positioned at the opposite sides of the flattened sheath or body, and each conductor is embedded in a secondary sheath of insulating material, which is integral with the remainder of the cable insulation.

The hollow sheath provides an air-containing enclosure in that region intermediate the two conductors which is subject to the maximum electrostatic stress during use of the cable. In so doing, it provides optimum electrical characteristics in accordance with known principles governing the design of cable type, high frequency transmission lines. At the same time, the inner wall surfaces are of special shape, which greatly facilitate the division and separation of the two conductors (and the insulation disposed about those conductors) during installation of the cable. In addition, the special shape of the sheath greatly facilitates the sealing of the ends of the cable, in instances where that is desired, and has other advantages, as will hereinafter appear.

Cables of this type are most conveniently manufactured by an extrusion operation in accordance with the method disclosed in my earlier Patent No. 2,149,002, which is particularly directed to the manufacture of duplex insulated cables having a central void or passageway intermediate and spaced from the two wire conductors. Apparatus suitable for the practice of this method is illustrated in Figure 1. The particular apparatus there shown includes a main casing or housing 21, which serves as the support for the other elements of the structure, and which is provided with a central chamber 23 for containing the insulating material, indicated at 25, which is to be applied to the conductor.

The cross-sectional outline of the cable sheath is determined by the shape of a die opening 27 in a die piece 29, which is supported by a suitable threaded support element 31, adapted to be screwed into the outer casing 21, as shown. The two wire conductors 33 are guided through the extrusion mechanism by means of a guide tip 35, which is supported on a suitable support element 37 extending into the central cavity 23 of the casing. The guide tip 35 includes suitably spaced, longitudinal bores 39 for receiving and guiding the conductor wires. A screw 41 or other feed mechanism is provided for applying the insulating compound about the conductor wires 33 and for forming the sheath as the wires are drawn through the guide tip 35 and the die 27.

To form the desired, special contour in the interior of the sheath, the guide tip 35 is provided with an extension 43, as illustrated in Figure 2, which may extend into, or in proximity to, the die opening 27. By proper control of the temperature and pressure conditions within the chamber 23 and the temperature relationships maintained in the region of the die 29 and the guide tip 35 during the extrusion operation, it is possible to form cables of the subject type continuously in any desired length at high speed, while maintaining very close dimensional tolerances in the cable. Also, by varying the shape of the wire-supporting, guide tip 35, the projection 43, and the die opening 27, it is possible to manufacture cable of almost any desired shape.

A particularly satisfactory cable arrangement, which can be manufactured on the apparatus described above, is illustrated in perspective in Figure 3, and in cross section in Figure 4. In this construction, the cable sheath 45, which comprises a flattened, elliptically-shaped body, is formed with a longitudinally-extending, open, central void, or pasageway, 47, and with four, longitudinally-extending, V-shaped grooves 49, located as shown in Figures 3 and 4. For optimum electrical characteristics, the central passageway 47 should occupy not less than from about 60 to 75% of the total cross-sectional area of the cable.

The wire conductors 51 are positioned along the two sides of the sheath, and are each embedded in a secondary sheath, or sleeve, 53 of insulation, integral with the main sheath 45. The grooves 49 extend parallel to the conductors 51 and into, but not quite through, the main sheath 45.

An important function of the grooves 49 is to facilitate separation of the conductors 51 and the surrounding insulation 53 from the remaining portions of the cable. This separation can be conveniently effected by use of a knife, cutting pliers or other mechanism, or under favorable conditons, the insulation can be simply torn apart, as a result of the weakening of the sheath walls in the region of the grooves.

The arrangement for effecting convenient separation of the conductors 51 and their insulation from the remainder of the cable has a further important function in that it permits the end of the cable to be very readily sealed, following the conductor separation operation. As shown in Figure 5, cutting of the sheath insulation 45 along the general lines indicated at 5—5 and 6—6 of Figure 3 will result in the production of two flaps or strips 55 and 57 of insulation, which can be bent back along one of the sides of the cable. When in this position, the application of a heated soldering iron or a flame to the end of the cable will melt the usual insulation employed in cables of this type to form a tight seal, as illustrated at 59 in Figure 6. In instances where the insulation is not a thermo-plastic material suitable for handling in this manner, the two strips or flaps 55 and 57 can be cut off and a suitable sealing compound applied. In either instance, the sealing is a simple and readily performed operation, which is of especial importance when installations are being made outdoors and in elevated locations.

Various types of insulating materials can be used in the manufacture of cables in accordance with the invention. For high frequency use, it is, of course, important that the insulating material shall have suitable dielectric and low-loss characteristics, and materials compounded from polyethylene resins are particularly suitable for this purpose. It will be understood, however, that other insulating materials can be used. For example, various rubber compounds, especially compounds of various of the synthetic rubber materials, give very satisfactory results, particularly in instances where power at frequencies in the V.H.F. band is to be transmitted.

The wire conductors used in the cable are desirably of small diameter in order to minimze the cable capacitance, and, for convenient installation, it is desirable that the cable shall be of flexible, stranded construction. For television lead-in purposes, conductors consisting of 7 strands of No. 28 A.W.G. wire, cabled together to provide a conductor having an over-all diameter of approximately .039 inch, will be found very satisfactory. For V.H.F. and U.H.F. installations, it is undesirable to use a conductor having a diameter greater than .047 inch.

The relative dimensions of the cable are also of importance. For television lead-in and similar V.H.F. and U.H.F. service, the cross-sectional outline of the cable should be such that the minor axis, indicated at $n$ in Figure 4, preferably has a length between one-fourth and one-half the length of the major axis, indicated at $m$ in Figure 4. Also, as previously stated, the central passageway within the cable sheath should occupy at least 60% of the total cross-sectional area of the cable.

Other structural arrangements capable of being manufactured in continuous lengths by the use of extrusion equipment of the general type illustrated in Figure 1 are shown in the cross-sectional views of Figures 7, 8, 9 and 10. These arrangements, similar to the cable structure shown in Figures 3 and 4, are designed to permit convenient division of the cable to effect separation of the two cable conductors, and convenient sealing of the cable ends in instances where that is desired. The overall cross-sectional outline of each of the cable structures shown in Figures 7, 8, 9 and 10 is that of a flattened oval or ellipse, and may be similar to the outline of the Figure 3 structure.

The cable structure shown in Figure 7 has a sheath 61 provided with a longitudinally-extending central passageway or cavity 63, similar to the central passageway 47 in the Figure 3 arrangement, and as in that arrangement, the central passageway 61 may occupy as much as 60 to 75% of the total cross-sectional area of the cable. The passageway 63 terminates short of the two conductors 65 in order that each conductor will be embedded in a solid body or sleeve 67 of insulating material at each side of the main sheath. V-shaped grooves 69 which extend longitudinally of the cable sheath 61 are provided in the central portion thereof, and as in the previously described structure, the grooves 69 define lines along which the cable conductors may be conveniently separated during installation of the cable. The grooves 69, extend into, but not entirely through, the walls of the sheath, a wall thickness at the bottom of the groove of from .020 to .025 inch being satisfactory for television lead-in cables made from polyethylene insulation. Again, as in the previously described structure, the cable may be readily sealed, especially when it is manufactured of polyethylene or other thermoplastic material, by the use of a hot iron or a flame. Alternatively, a plug of sealing compound may be introduced into the open end of the sheath.

The structure illustrated in Figure 8 is generally similar in construction to the cable structure illustrated in Figures 3 and 4, except that the central void or passageway within the cable sheath is divided into two symmetrical sections 73 and 74 by a transversely-extending rib 75, formed integral with the sheath. This arrangement produces a cable which is somewhat more resistant to crushing, and is also somewhat stronger than the Figure 4 arrangement. The construction includes longitudinally-extending grooves 77 adjacent the insulation sleeves 79 at the sides of the sheath, which surround each of the conductors 81. The grooves 77 facilitate the separation of the cable conductors and the sealing of the end of the sheath, as in the other structures.

In a construction of the general type shown in Figure 8, it is possible to effect separation of the conductors and the insulation surrounding those conductors, even in the absence of grooves such as are shown at 49 and 77 in Figures 4 and 8. A construction omitting these grooves is shown in Figure 9, that structure being otherwise substantially similar to the Figure 8 arrangement. When such a cable is being used, the central passageway in the cable sheath, with or without the rib 75, serves as a guide for a cutting tool, and while the Figure 9 arrangement is less satisfactory than the constructions which include grooves or other specially designed means for additionally weakening the walls of the sheath in the region where division of the conductors is to be effected, it does constitute a divisible type cable.

The construction illustrated in Figure 10 is designed to facilitate separation of the cable into two sections, while, at the same time, providing a reinforcing rib centrally of the sheath. This is accomplished by extruding the sheath 85 with a double-walled rib 87, having therein a slot-like opening or passageway 89, which extends transversely of the sheath, centrally of the rib. The passageway 89 in the illustrated arrangement includes tapered end sections 91 which extend into fairly close proximity to the surface of the sheath 85. As in the other embodiments of the invention, the two conductors 93 are embedded in a suitable sleeve or bead section 95 of insulating material which extends along both sides of the cable. The main central passageways 96 within the cable are similar to the passageways 73 and 74, and occupy from about 60-75% of the total cross-sectional area of the cable. It will be apparent that the arrangement of Figure 10 is particularly adapted for easy separability along the median line of the cable. The individual conductors may likewise be separated quite easily from the two cable sections when that is desired. It will also be apparent that sealing of the cable ends can be readily accomplished, either by fusion of the separated insulation portions, or by a plugging and cementing operation.

As previously pointed out, one of the more serious deficiences of the prior art, hollow sheath constructions has resulted from the fact that unless the cable is sealed, moisture and dirt will tend to collect on the interior surface of the sheath during the life of the cable. This is especially true in home installations, where the inner end of the hollow sheath may be open to warm, humidified air indoors of the house, while the other end is open to the outdoors. Under such conditions, air may flow through the cable in a fairly steady stream, and during cold weather, the moisture contained in such air will condense on the interior of the sheath. Rain and smoke are also troublesome from this viewpoint. This difficulty can be effectively avoided, and a cable with a much more reliable operative life can be produced by sealing the central cavity or passageway in the sheath at intervals along the cable length, and two arrangements of the type are shown in Figures 11-14.

In the arrangement shown in Figures 11 and 12, the desired sealing of the cable is accomplished by the periodic injection into the interior of the hollow sheath 101, during the extrusion operation, of a quantity of insulation material, as indicated at 103. Such injection can be accomplished by providing a bore in the guide tip 35, as indicated by the dotted outline 97 in Figure 2, and periodically expelling the proper amount of insulating material through this bore into the interior of the cable sheath. A simple piston pump or the like can be used for this purpose. The resulting cable is provided with a series of sealed cells 105. Due to the rather substantial length of the usual cable of the subject type, it will usually be found satisfactory to effect sealing of the cable at intervals of perhaps 2-3 feet, although sealing at lesser intervals is not objectionable.

The provision of internal seals at substantial intervals along the length of the cable, as indicated, has the further advantage that changes in the ambient pressure tend to minimize somewhat the stresses produced in the cable walls. It is also possible, when using certain types of insulating material, including certain of the polyethylene and some of the rubber compounds, to effect sealing of the sheath so as to provide a series of individually sealed cells along the length of the cable by passing the cable between pressure rolls having suitable, heated, coacting projections on the surfaces thereof.

These heated projections are positioned to force together the side walls of the sheath and will seal those walls to provide unitary cells. The result is illustrated in Figures 13 and 14, wherein a cable, which may be similar to any of the previously described embodiments of the invention, is indicated generally at 107. The pressed-together sections of the sheath are shown in these figures at 113, the individual cells at 111, and the cable conductors at 115. Here again, the spacing is desirably at fairly substantial intervals, although spacing at less intervals is not objectionable.

In both of the previously described cellular constructions, the cells are hermetically sealed, rendering the cable dirt-proof and moisture-proof, with the resultant production of a cable having substantially improved electrical characteristics throughout its operative life. Further, the provision of these cells in the illustrated arrangement is accomplished at low cost and as an incident to the manufacture of the cable in continuous lengths.

As previously indicated, the cross-sectional arrangement of the cables shown in Figures 11-14 may be in accordance with any of the arrangements previously described, and the presence or absence of a central rib will have no substantial effect on the sealing operation. Also, as in the previously described arrangements, the cables are of a readily divisible construction to permit convenient separation of the duplex conductors, together with the insulation in which each of the conductors is embedded, during installation of the cable.

In contrast with the divisible, duplex, high frequency cable constructions which have been proposed in the past, the cables described in the foregoing are quite flexible and can be bent along curves of short radius, thereby greatly facilitating the installation of the cable, especially as a television lead. Further, cables in accordance with the invention can be readily twisted to effect transposition of the conductors—a substantial impossibility with the known tubular cable arrangements—and the installation of cables in accordance with the invention require little, if any, change in existing installation practices or equipment.

The cables of the present invention can be manufactured in continuous lengths on high speed extrusion equipment, at minimum cost, and the possible cost reduction is further aided by virtue of the fact that the cable has a hollow center and requires a minimum amount of insulation in its construction. A particularly important feature of the cable of the invention is, as previously described, the provision of means for effecting easy division of the sheath into two or more sections and separation of the conductors.

Various of the features of the invention believed to be new are set forth in the accompanying claims.

I claim:

1. A duplex, electrical conductor cable for the transmission of high frequency, electrical energy, comprising a pair of spaced conductor wires, and a sheath of insulating material within which said conductors are disposed, said sheath having a cross-sectional outline which approximates the outline of a flattened oval or ellipse, the two electrical conductors being located at opposite sides of said sheath and being each embedded in a sleeve of insulating material which is integral with said sheath, said sheath having at least one longitudinally-extending passageway located intermediate said spaced conductors, and of such dimensions that at least about 60% of the cross-sectional area of the cable is occupied by air, the interior contour of said sheath being such that division of each of said conductors and the insulation embedding that conductor from the remaining portions of the cable is facilitated, and said longitudinally-extending passageway being sealed at spaced intervals along the length of said cable by insulating means integral with said sheath which extends across said passageway to provide a series of sealed, air-containing cells.

2. A duplex, electrical cable for the transmission of high frequency electrical energy comprising a pair of spaced conductor wires, and a sheath of insulating material within which said wires are disposed, said sheath having at least one longitudinally-extending passageway located centrally thereof, the two electrical conductors being located at opposite sides of said sheath and each being embedded in a sleeve of insulating material which is integral with said sheath, said centrally disposed passageway being of such dimensions that at least 60% of the cross-sectional area of the cable is occupied by air, and said sheath including insulating means integral therewith which extends across said passageway at spaced intervals along the length of said cable to provide a series of sealed, air-containing cells.

3. A duplex, electrical cable for the transmission of high frequency, electrical energy, comprising a pair of spaced, flexible conductor wires, and a sheath of insulating material within which said conductor wires are disposed, said sheath having a cross-sectional outline which approximates the outline of a flattened oval or ellipse, the two electrical conductors being located at opposite sides of said sheath and being each embedded in a sleeve of insulating material which is integral with said sheath, said sheath having formed therein a plurality of longitudinally-extending passageways which are located intermediate said spaced conductors and at least one longitudinally-extending rib which separates said passageways, said passageways occupying at least about 60% of the cross-sectional area of the cable, said longitudinally-extending passageways being sealed at spaced intervals by insulating means integral with said sheath which extend across said passageways to divide said sheath into a series of sealed, air-containing cells, and the interior surface of said cable being provided with at least one groove located adjacent the insulation sleeve surrounding at least one of said conductors and extending longitudinally of said cable for facilitating the separation of said conductor and the insulation surrounding said conductor from the remaining portions of the cable.

References Cited in the file of this patent

UNITED STATES PATENTS

| | | |
|---|---|---|
| 2,034,034 | Green et al. | Mar. 17, 1936 |
| 2,076,711 | Eagleson | Apr. 13, 1937 |
| 2,116,643 | Rost | May 10, 1938 |
| 2,149,002 | Wermine | Feb. 28, 1939 |
| 2,543,696 | Krueger | Feb. 27, 1951 |
| 2,626,303 | Link | Jan. 20, 1953 |
| 2,805,276 | Weitzel | Sept. 3, 1957 |

FOREIGN PATENTS

| | | |
|---|---|---|
| 82,461 | Germany | Aug. 6, 1895 |
| 630,097 | Great Britain | Oct. 5, 1949 |